United States Patent [19]

Glitho

[11] Patent Number: 5,583,848
[45] Date of Patent: Dec. 10, 1996

[54] METHODS FOR VERIFICATION OF ROUTING TABLE INFORMATION

[75] Inventor: Roch Glitho, Montreal, Canada

[73] Assignee: Telefonaktiebolaget L M Ericsson, Stockholm, Sweden

[21] Appl. No.: 339,757

[22] Filed: Nov. 15, 1994

[51] Int. Cl.⁶ .................................................. H04J 3/14
[52] U.S. Cl. ........................................ 370/248; 370/400
[58] Field of Search ................................. 370/94.3, 85.13, 370/14, 17, 13.1, 16, 94.1

[56] References Cited

U.S. PATENT DOCUMENTS

| | | | |
|---|---|---|---|
| 4,233,607 | 8/1993 | Barwig et al. | 370/94.1 |
| 4,486,877 | 12/1984 | Turner | 370/15 |
| 4,670,871 | 6/1987 | Vaidya | 370/60 |
| 4,696,000 | 9/1987 | Payne, III | 370/60 |
| 4,745,593 | 5/1988 | Stewart | 370/15 |
| 5,014,262 | 5/1991 | Harshavardhana | 370/16 |
| 5,241,533 | 8/1993 | Kimoto et al. | 370/13.1 |
| 5,265,092 | 11/1995 | Soloway et al. | |
| 5,303,235 | 4/1994 | Chan | 370/60.1 |
| 5,423,003 | 6/1995 | Berteau | 395/200 |
| 5,440,547 | 8/1995 | Easki et al. | 370/60 |

FOREIGN PATENT DOCUMENTS

0511927A2  3/1992  European Pat. Off. .

OTHER PUBLICATIONS

Kraig R. Meyer, Dr. Deborah Estrin, *A Network Management Tool for Inter-Domain Policy Routing*, Jan. 1, 1992, pp. 133–143.

CCITT Draft Recommendation Q. 751 "Signalling System No. 7 –Managed Objects", R. A. Adams, Geneva, Mar. 9–20, 1992, pp. 1–10.

CCITT Recommendation Q. 753 "Signalling System No. 7 –Management Functions MRVT, SRVT, CVT and Definition of OMASE –User", R. A. Adams, Geneva, Mar. 9–20, 1992, pp. 1–12.

*Primary Examiner*—Douglas W. Olms
*Assistant Examiner*—Matthew C. Phillips
*Attorney, Agent, or Firm*—Jenkens & Gilchrist

[57] ABSTRACT

There is disclosed a method for auditing routing information in a packet switching network. One method involves utilizing the telecommunications management network to sample through a general purpose management interface routing table information at live nodes in the operating network for a test message sent from a test initiator node to a final destination node through intermediate nodes. The telecommunications management network subsequently runs verification tests on the collected routing table information apart from the packet switching network. This method has the advantage that the verification test is not run on the network while still testing actual table routing information. Advantageously, this method tests actual routing information without overloading the network with additional routing requests provided by the test. Moreover, this method does not induce any load on the network. Further, this method uses data collected in real time from the network.

18 Claims, 4 Drawing Sheets

FIG.2

| NODE | Primary Link Set | Alternative Link Sets |
|------|------------------|----------------------|
| 12   | 27               | 28,26                |
| 14   | 32               | 34                   |
| 16   | 40               | 30                   |
| 18   | 42               | 36                   |
| 20   | 38               | No Entry             |

FIG.4

| NODE | Primary Link Set | Alternative Link Sets |
|------|------------------|----------------------|
| 12   | 27               | 28,26                |
| 14   | No Entry         | No Entry             |
| 16   | 40               | 30                   |
| 18   | 42               | 36                   |
| 20   | 38               | No Entry             |

FIG.5

| NODE | Primary Link Set | Alternative Link Sets |
|------|------------------|----------------------|
| 12   | 27               | 28,26                |
| 14   | 32               | 34                   |
| 16   | 40               | 30                   |
| 18   | 42               | 36,34                |
| 20   | 38               | 36                   |

METHODS FOR VERIFICATION OF ROUTING TABLE INFORMATION

FIELD OF THE INVENTION

The present invention relates to a method for auditing routing table information in a packet switching network. In particular, it relates to a method of checking the correctness of routing table information associated with respective switching nodes or signal transfer points of Signaling Systems No. 7 (SS7) networks.

BACKGROUND OF THE INVENTION

Routing of messages from a source node to a destination node in networks, such as for example packet switched networks (PSN's), is performed automatically by the use of routing tables. A routing table is located at each node of the network and contains information as to the link set between nodes that the message is to be transmitted. This information usually includes a preferred or normal route and one or more secondary or failure routes.

Signaling System No. 7 (SS7) interconnects stored program control exchanges, network data bases and intelligent peripherals of telecommunications management networks. SS7 is used to exchange messages and information respectively related to call management and to distributed applications and network management. The protocols of SS7 have been standardized by the "Comite Consultatif International pour le Telephone et le Telegraphe" (CCITT) which is known today as the International Telecommunications Union (ITU)—Telecommunications Standardization Sector (TSS).

To operate properly, the correct routing table information is loaded and stored in each table at system start-up or generation. This information is constant and the routing table is described as "static". The routing tables may also be described as "partial path" because the information stored in each table relates only to the next node on the way to the destination. The integrity of the routing information stored in the tables is fundamental to the normal functioning of the network.

Network communication problems arise when the routing information in tables is incorrect or becomes corrupted. One example of a problem is when the table fails to contain an entry for a destination node causing the message to stop at that node and to fail to make it to its destination. Another problem example occurs when the two node tables contain destination information directed to each other resulting in the message traveling in an endless loop. A third message transmission problem occurs when the message tree between the source node and the destination node results in an excessive length route where the message crosses more STP's than the maximum allowed STP's in the network. Still yet another problem occurs when the signal path through the network is unidirectional. That is to say the message can travel in one direction through the tree from the source node to the destination node but it cannot travel in the reverse direction from the destination node to the source node.

In SS7 networks there are currently two methods used to check the correctness of SS7 routing tables.

The first method involves checking "off-line" the correctness of the routing data before the introduction of this data to the tables. Various simulation methods are used for to check the information. The problem with this method resides in errors introduced during the manual data entry of the information in the table for each node by the operational staff. Further, data corruption can occur after entry. This "off-line" method of testing table data information does not safe-guard against errors occurring during loading of the data in the tables or against errors due to data corruption.

The second method used to check the correctness of SS7 routing tables is a real time check of the table routing data in the network. It consists of auditing "on-line" during network operation the routing data after it has been introduced in the tables. There are two known "on-line" tests in use today to check the correctness of SS7 routing data. These tests are known as the Message Transfer Part (MTP) Routing Verification Test (MRVT) and the Signalling Connection Control Part (SCCP) Routing Verification Test (SRVT). The MRVT and the SRVT check respectively the content of the Message Transfer Part (MTP) routing tables and the content of the SCCP routing tables. These tests are initiated at one or more predetermined source nodes to test the routes messages will follow to respective predetermined destination nodes. Usually each test results in the message following all possible routes to its test destination. This is done by sending multiple test messages and tracking the identities of all nodes crossed by the message. Information on the success of this testing is transmitted back to the destination node. An example of an "on-line" testing procedure is disclosed in U.S. Pat. No. 4,745,593 issued May 17, 1988 to Gilbert M. Stewart.

One problem with this "on-line" testing of routing table information is that such testing requires additional software. In SS7 signalling systems the functioning of the routing verification tests (MRVT and SRVT), besides the need of the MRVT/SRVT software package, require a Transactions Capabilities Application Part (TCAP) software package in each node. TCAP is an SS7 User Part that most SS7 nodes do not have today. From the standpoint of many operators, the benefits of the routing verification tests do not justify the cost of installing a TCAP software package in a node that would have otherwise done without it.

Another problem associated with this routing verification testing is the extra network loading associated with the testing. The networks are already operating under time restraints to deliver messages between source nodes and destination nodes. The introduction of the "on-line" testing to be thorough should be conducted on several nodes over a predetermined time interval. For example, if a network has 20 nodes, there could be hundreds of possible test routes to follow in one test. This one test could significantly load the network. SS7 networks are signalling networks with very stringent delay objectives that the networks can hardly meet when they are overloaded. Consequently, operators are reluctant to perform tests of routing tables in networks.

In view of the foregoing, it can be appreciated that there is a problem with routing table information and the verification of that information particularly after the table information has been loaded into the network. There does not appear to be a solution available to the operator to check actual routing information without unduly overloading the network with test messages thereby placing legitimate messages at risk of being lost.

SUMMARY OF THE INVENTION

In accordance with an aspect of the present invention there is provided a method for auditing routing information in a packet switching network. The method involves utilizing the telecommunications management network (TMN) to sample and collect through a general purpose management interface routing table information at nodes in the operating network for a test message sent from a test initiator node to a final destination node through intermediate nodes. The telecommunications management network subsequently runs verification tests on the collected routing table information apart from the packet switching network. This method has the advantage that the verification test is not run on the network and still tests through simulation actual table routing information used by nodes in the network.

It should be understood that the TMN is a management network which is conceptually separated from the telecommunications network. The TMN is specified in CCITT recommendation M.3010 and herein incorporated by reference.

Advantageously, this method tests actual routing information without overloading the network with additional routing requests provided by the test. Moreover, this method does not induce any load on the network. Further, this method uses data collected in real time from the network.

In respect of CCITT SS7 networks, this method does not require the audit logic with its associated software packages (MRVT ASE, OMASE, TCAP,ASE).

The method of the present invention is for auditing routing information in a packet switching network comprising a plurality of packet switching nodes and a plurality of bi-directional links each interconnecting a distinct pair of said nodes. The packet switching network has associated therewith a telecommunications management network comprising an operation system connected to each of said nodes through respective interfacing links. The method comprises the step of collecting actual routing data of link sets between nodes for sampled nodes in the switching network from a testing initiator node to a destination node. The method further includes the step of transferring collected routing data from each of the sampled nodes through the respective interfacing links to the operation system. The method then conducts an audit verification test of the routing data in the operation system remote from the packet switching network.

It should be understood that the operation system represents the supervisory or control systems of the TMN. It should also be noted that the operation system is defined in CCITT recommendation M.3010 previously mentioned.

BRIEF DESCRIPTION OF THE DRAWINGS

For a better understanding of the nature and objects of the present invention reference may be had to the accompanying diagrammatic drawings in which:

FIG. 2 illustrates a correct routing table for the switching network of FIG. 1;

FIGS. 4 and 5 represent incorrect routing tables; and,

DETAILED DESCRIPTION

Figure 1:
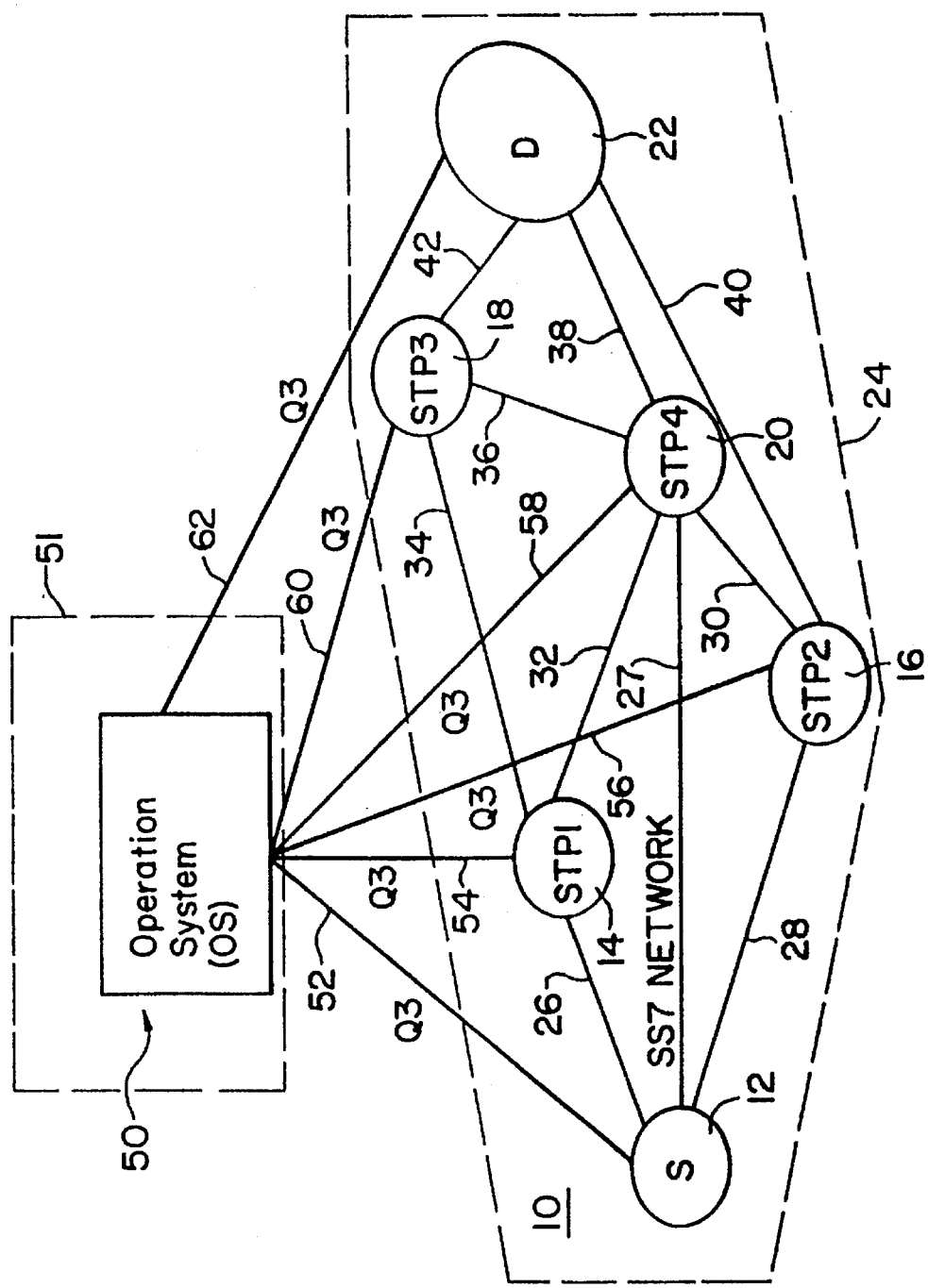
FIG. 1 illustrates the interrelationship between the telecommunications management network and the switching network of the present invention.

Referring to FIG. 1 there is shown a switching network 10 within the broken lines 24. Switching network 10 includes 6 switching nodes or signalling transfer points labeled 12, 14, 16, 18, 20, and 22. The illustrated network has been drawn to illustrate a start or initiation node 12, a destination node 22 and intermediate nodes 14, 16, 18, and 20. It should be understood that for the purpose of this description, the start node 12 and the destination node 22 may be intermediate nodes in other signal transfers, but have been so designated for the purpose of defining one verification test to be conducted by the method of the present invention.

The switching network of the preferred embodiment of the present invention shown within broken line 24 is a CCITT SS7 network. Each of the nodes 12 through 22 respectively shown within the network includes a routing table associated therewith for routing a signal along one or more link sets to a subsequent node in the routing of the signal within the network. The routing table information is both static and partial path. The link sets between the nodes are shown by link set connection 26 between nodes 12 and 14, link set 27 between nodes 12 and 20, link set 28 between nodes 12 and 16, link set 30 between nodes 16 and 20, link set 32 between nodes 14 and 20, link set 34 between nodes 14 and 18, link set 36 between nodes 18 and 20, link set 38 between nodes 20 and 22, link set 40 between nodes 16 and 22, and link set 42 between nodes 18 and 22.

Referring to FIG. 2 there is shown an example of the routing table information for each of the nodes 12 through 20. In the middle column of Table 1, the primary link set is defined as the preferred or primary route along which a message or a signal is transferred from the node defined in the left most column. The right most column indicates alternative link sets along which a signal will pass or travel in the event the primary path is either disabled or busy. Accordingly, a message at node 12 will be sent primarily along link set 27 to node 20. In the event a message cannot be sent along link set 27, node 12 will switch the message to send it either along link set 26 to node 14 or link set 28 to node 16. Likewise, node 14 will primarily send its message over link 32 to node 20 however, in the event that node link 32 is busy or not able to function, node 14 will route its message along link 34 to node 18. Node 16 has primary route along link set 40 to node 22. In the event that the signal cannot travel along link set 40, node 60 will direct its message along link set 30 to node 20. Node 18 has a primary message routing along link set 42 to node 22 and a secondary or alternate path along link set 36 to node 20. Node 20 has a primary route along link set 38 to node 22. In this example, node 20 has no alternative link set route.

With this routing information table in FIG. 2, a message initiated at node 12 having a destination of node 22 may follow a route to the destination node through several different switching nodes depending on the channels that are open for communicating the messages between the nodes.

Figure 3:
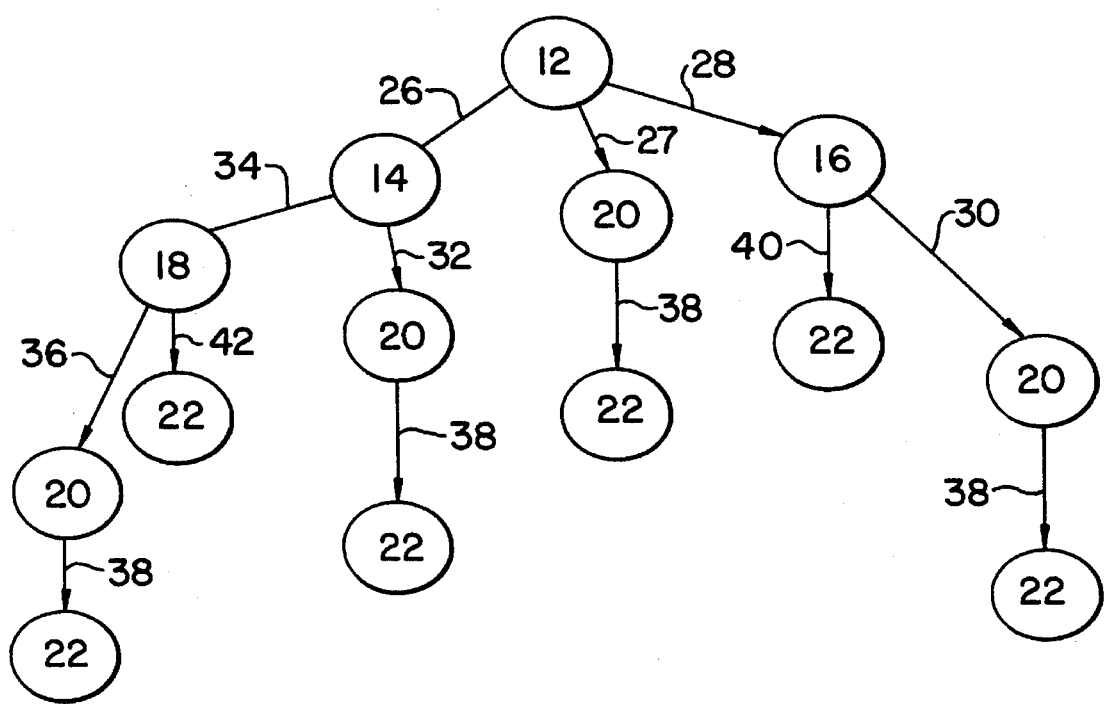
FIG. 3 illustrates message tree for routing table of FIG. 2.

Referring to FIG. 3 there is shown a message tree for the SS7 network portion of FIG. 1 and the routing table of FIG. 2. From the message tree of FIG. 3, it can be seen that there are potentially 6 working paths through different nodes that the message can follow to get to the destination node 22 from the initiation or the starting node 12. The primary route for a message to travel from start node 12 to destination node 22 is (from FIG. 2) along link set 27 to node 20. Once the message is at switching node 20, switching node 20 would direct the message along link set 38 to destination node 22. In the event these channels or link sets are not open, then an alternative route would be determined to the destination node 22 from the start node 12 through which a communication channel would be set up for transferring the message.

Referring back to FIG. 1 there is shown at 50 an operation system. The operation system forms part of the telecommunication management network shown diagrammatically within broken lines 51. The operation system is connected through a general purpose interface which has been referred to as a "Q3" interface. These Q3 interfaces have been defined in CCITT recommendation M.3100. Each interface is connected to a respective node in the SS7 switching network. The interface from the operation system 50 to node 12 is labeled 52, to node 14 is labeled 54, to node 16 is labeled 56, to node 20 is labeled 58, to node 18 is labeled 60, and to node 22 is labeled 62.

It should be understood that the operation system is part of the telecommunications management network hierarchy that runs various controls on the network to insure that the network is operating properly and to control the operation of the actual signalling system of the network.

In accordance with the present invention, the operation system 50 is adapted to conduct routing verification tests of the nodes in the network in the SS7 signalling network. At a predetermined instant in time, the operation system will conduct a test for a chosen initiation node and a chosen destination node. The operation system will first sample at a predetermined time the routing table information in the initiation node 12. Upon receipt of this information, the operation system will sample the routing table information in the one or more nodes connected to the primary link set and any alternative nodes connected through alternative link sets from the start up node 12. Subsequent to this sampling step, the operation system 50 will collect information at each successive node concerning the primary link sets and the alternative link sets. The routing data sampling or collection stops at a node when one of the three following conditions is met:

1. The node is the destination.
2. There is no entry in the routing table of the node for the destination.
3. The information at the node has already been collected.

For the network shown in FIG. 1 and the routing table shown in FIG. 2, the operation system 50 first interrogates the routing table of node 12 and determines the primary links set to be sent to link set 27 with destination node 20 and the alternative link sets to be link sets 26 and 28 with destination nodes receptively 14 and 16. At the next instant in time the operation system will sample the routing tables at nodes 14, 20 and 16. With respect to node 14 it will note that the primary link set is link 32 connecting it to node 20 and the secondary link set is link 34 connecting it to node 18. At this instant in time also node 20 is interrogated and a note is made that the primary link set 38 connecting the channel to destination node 22. Since this is the destination node, the routing data collection for that path stops. At the same instant in time node 16's routing table is interrogated to determine that its primary link set is 40 and its secondary link set is 30. Since link set 40 connects 16 to node 22 which is the destination node, the routing data collection for the path stops. At the next instant in time nodes 18, 20 will be interrogated. Since node 20 is also already known to be a direct path through link set 38 to node 22 destinations route, the resulting data collection for these two paths stops. With respect to node 18, it is noted that the direct route or primary link set is link set 42 which leads directly to node 22 and the routing data collection will stop for this path. The alternative link set is through link set 36 to node 20 which has already been determined as having a correct routing table through link set 38 to node 22 and the routing data collection will stop for this path. The operation system operates in a fashion to collect the routing table information. The MRVT algorithm as specified today is then run in the operation system using the routing data collected from the network. No fault will be detected since the information in the routing tables is correct. This MRVT process is conducted in the operation system and as a result no live signals or messages are sent through the SS7 signalling network from the start node to the destination node.

In order to determine how the operation system locates incorrect routing information, reference may be had to FIG. 4 which shows a routing table where certain information is incorrect. The routing table of FIG. 4 will yield a message tree similar to that of FIG. 3. The message tree will differ for all messages travelling through node 14. In FIG. 4 node 14 has no primary link or alternative link set defined. Accordingly, once a message reaches node 14 its travel ends. Referring to FIG. 3, it will be seen that in the first pass of collecting information at node 12 an alternative link set 26 is shown connecting the message to node 14. However, since node 14 has no further routing information for the destination, the routing data collection will stop for this path.

In the second phase or step, the MRVT algorithm is run in the operation system on the collected data. The algorithm will detect the fault "unknown destination" at node 14. It should be understood that while this specific fault can be detected during collection of routing data, some other fault conditions cannot be detected at this stage. Accordingly, it is important to first collect the routing data and then simulate the MRVT test on the data collected "live" from the network in the operation system.

Figure 6:
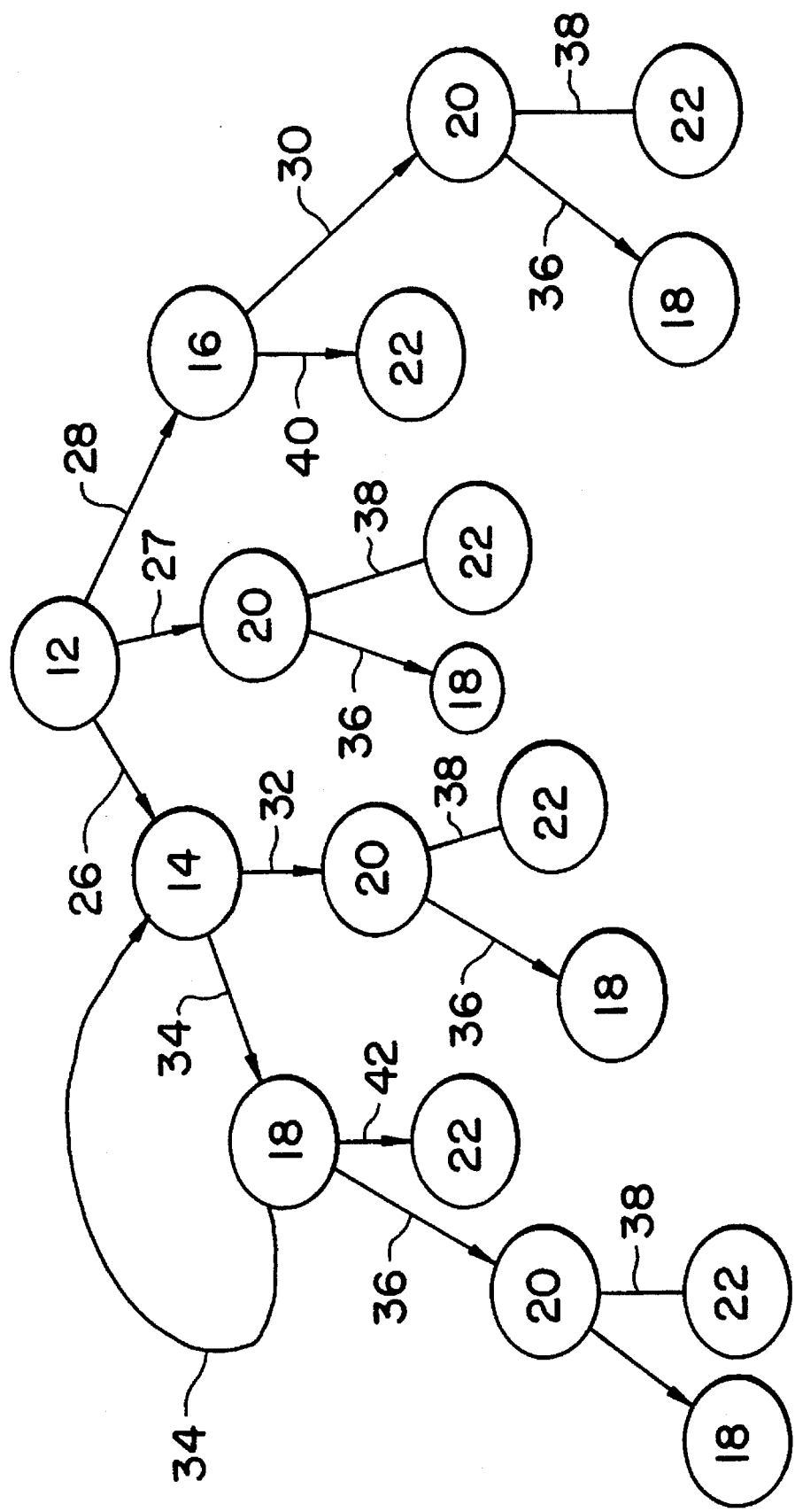
FIG. 6 is a message tree for the routing table of FIG. 5.

Referring to FIG. 5, there is shown a table having routing information which results in looping of the message. To better understand the effect of the routing information shown in Table 5 on the communication of the message within the network, reference may be had to FIG. 6 which shows the message tree for the routing information of FIG. 5. From FIG. 6, a sampling of the operation system contains a sample of the tables in similar fashion as that described with respect to FIG. 3. However, it should be noted that in the left most path node 18 has a loop to node 14. Thus, it would be possible in some instances for a message traveling in through the routing data of this Table to be connected into a channel where the information would just loop within the channel and never make it to the destination node. With respect to node 20, it is also seen that node 20 has an alternative link set that defines a path that can result in a message not making it to the destination but being returned to node 18. This creates another potential loop in the routing of a message through the network. Once the data is collected from the routing tables, the MRVT algorithm is run in the operation system 50 and it detects all loops in the network.

While the present invention has been developed for application in CCITT SS7, it should be understood that it finds applications in all other SST networks and may also have application in other packet switching networks.

I claim:

1. A method for auditing routing information in a packet switching network comprising a plurality of packet switching nodes and a plurality of bi-directional links each interconnecting a distinct pair of said nodes, the packet switching network having associated therewith a telecommunications management network comprising an operation system connected to each of said nodes through respective interfacing links, said method comprising the steps of:

collecting actual routing data of link sets between nodes for sampled nodes in the switching network from a testing initiator node to a destination node within the network;

transferring collected routing data from each of the sampled nodes through the respective interfacing link to the operation system; and, conducting a simulated audit verification test from the testing initiator node to the destination node on the collected routing data in the operation system remote from the packet switching network.

2. The method according to claim 1 wherein the step of collecting actual routing data further includes the steps of
   (a) the operation system initiating the test by collecting a table record at the test initiator node containing at least one link set listed as leading to intermediate nodes or ultimately the test destination node; and,
   (b) the operation system subsequently collecting the table record containing at least one link set listed for the intermediate node pointed to by a previously collected table record.

3. The method of claim 1 wherein the step of transferring sampled routing data from the sampled node to the operation system utilizes a Q3 general purpose management interface.

4. The method of claim 1 wherein the step of conducting the simulated audit verification test includes the step of conducting one or more of a message transfer part routing verification test and/or a signalling connection control part routing verification test on the collected routing data.

5. A system for auditing routing information in a package switching network comprising a plurality of package switching nodes and a plurality of bi-directional links each interconnecting a distinct pair of the said nodes, the packet switching network having associated therewith a telecommunications management network, the system including:
   an operation system functioning independently and remotely of the packet switching network and forming part of the telecommunications management network;
   interfacing links connected between the operation system and respective ones of the switching nodes for sampling routing table data information at that node; and,
   the operation system choosing a starting node and a destination node for a verification test, collecting actual routing table information sequentially at each of the nodes in the switching network, and thereafter performing simulated audit verification tests remotely of the signalling network using the actual routing table information collected from each node to verify the accuracy of this information.

6. The system according to claim 5 wherein the operation system initiates the test by collecting a table record at the test initiator node containing at least one link set listed as leading to intermediate nodes or ultimately the test destination node; and,
   the operation system subsequently collecting the table record containing at least one link set listed for the intermediate node pointed to by a previously collected table record.

7. The system of claim 5 wherein the interfacing links include Q3 general purpose management interface.

8. The system of claim 5 wherein the operation system conducts as the simulated audit verification test one of a message transfer part routing verification test and/or a signalling connection control part routing verification test.

9. The system of claim 5 wherein the operation system collection of a routing path in the switching network stops at a switching node when one of the following conditions are met:
   the node is the destination node,
   there is no entry in the routing table of the node for the destination, and
   the information at the node has already been collected.

10. A method for auditing routing information in a packet switching network comprising a plurality of packet switching nodes and a plurality of bi-directional links each interconnecting a distinct pair of said nodes, the packet switching network having associated therewith a telecommunications management network comprising an operation system connected to each of said nodes through respective interfacing links, said method comprising the steps of:
   collecting actual routing data of link sets between nodes sampled during real time operation of the switching network from a testing initiator node to a destination node within the network;
   transferring collected routing data from each of the sampled nodes through the respective interfacing link to the operation system; and,
   conducting a simulated audit verification test from the testing initiator node to the destination node on the collected routing data in the operation system remote from the packet switching network through simulation of the network.

11. The method according to claim 10 wherein the step of collecting actual routing data further includes the steps of
   (a) the operation system initiating the test by collecting a table record at the test initiator node containing at least one link set listed as leading to intermediate nodes or ultimately the test destination node; and,
   (b) the operation system subsequently collecting the table record containing at least one link set listed for the intermediate node pointed to by a previously collected table record.

12. The method of claim 10 wherein the step of transferring sampled routing data from the sampled node to the operation system utilizes a Q3 general purpose management interface.

13. The method of claim 10 wherein the step of conducting the audit verification test includes the step of conducting one or more of a message transfer part routing verification test and/or a signalling connection control part routing verification test on the collected routing data.

14. A system for auditing routing information in a packet switching network comprising a plurality of packet switching nodes and a plurality of bi-directional links each interconnecting a distinct pair of the said nodes, the packet switching network having associated therewith a telecommunications management network, the system including:
   an operation system functioning independently and remotely of the packet switching network and forming part of the telecommunications management network;
   interfacing links connected between the operation system and respective ones of the switching nodes for sampling routing table data information at that node during real time operation of the network; and,
   the operation system choosing a starting node and a destination node for an audit verification test, collecting actual routing table information sequentially at each of the nodes during real time operation of the switching network, and thereafter performing simulated audit verification tests remotely of the signalling network using the routing table information collected from each node from the starting node to the destination node to simulate routing in the network to verify the accuracy of this information.

15. The system according to claim 14 wherein the operation system initiates the test by collecting a table record at the test initiator node containing at least one link set listed as leading to intermediate nodes or ultimately the test destination node; and,
   the operation system subsequently collecting the table record containing at least one link set listed for the intermediate node pointed to by a previously collected table record.

16. The system of claim 14 wherein the interfacing links include Q3 general purpose management interface.

17. The system of claim 14 wherein the operation system conducts as the simulated audit verification test one of a message transfer part routing verification test and/or a signalling connection control part routing verification test.

18. The system of claim 14 wherein the operation system collection of a routing path in the switching network stops at a switching node when one of the following conditions are met:

the node is the destination node, there is no entry in the routing table of the node for the destination, and the information at the node has already been collected.

* * * * *